United States Patent [19]

Mori et al.

[11] Patent Number: 5,935,635
[45] Date of Patent: Aug. 10, 1999

[54] FEED ADDITIVE CONTAINING GRANULES AND CAKING PREVENTIVE AGENT

[75] Inventors: Kazuhiko Mori; Hisashi Osada; Toshihiko Ishiguri; Hisao Ito, all of Kawasaki, Japan

[73] Assignee: Ajinomoto Co., Inc., Tokyo, Japan

[21] Appl. No.: 08/648,560

[22] Filed: May 16, 1996

[30] Foreign Application Priority Data

May 16, 1995 [JP] Japan .................................. 7-116227

[51] Int. Cl.⁶ ....................................................... A23K 1/00
[52] U.S. Cl. ................... 426/656; 426/2; 426/53; 426/54; 426/61; 426/96; 426/97; 426/807
[58] Field of Search ............................... 426/96, 97, 443, 426/807, 53, 54, 61, 623, 630, 656, 2

[56] References Cited

U.S. PATENT DOCUMENTS

| | | | |
|---|---|---|---|
| 2,970,056 | 1/1961 | Benson et al. ............................ | 426/96 |
| 4,327,118 | 4/1982 | Georgen et al. ......................... | 426/807 |
| 4,996,067 | 2/1991 | Kobayashi et al. ...................... | 426/96 |
| 5,244,669 | 9/1993 | Satoh et al. .............................. | 426/96 |
| 5,532,008 | 7/1996 | Sasaoka et al. .......................... | 426/97 |

FOREIGN PATENT DOCUMENTS

| | | |
|---|---|---|
| 2217347 | 10/1974 | France . |
| 56-035962 | 4/1981 | Japan . |
| 59-169454 | 9/1984 | Japan . |
| 05192089 | 8/1993 | Japan . |
| 06296460 | 10/1994 | Japan . |
| 480397 | 11/1975 | U.S.S.R. . |

*Primary Examiner*—Lien Tran
*Attorney, Agent, or Firm*—Oblon, Spivak, McClelland, Maier & Neustadt, P.C.

[57] ABSTRACT

A feed additive comprising granules containing amino acids and other fermentation products and a caking preventive agent. The feed additive has excellent flowability, exhibits less caking following moisture absorption, and is convenient to use. and store.

11 Claims, No Drawings

FEED ADDITIVE CONTAINING GRANULES AND CAKING PREVENTIVE AGENT

BACKGROUND OF THE INVENTION

1. Field of the Invention

The present invention relates to a feed additive which is highly flowable and cakes less as well as to a process for producing the same. The feed additive of the invention mainly contains amino acids and is useful as an additive for animal feed, especially, for feed for pigs.

2. Discussion of the Background

Amino acids are well known as feed additives and can be obtained in highly pure form. For example, crystals of L-lysine (L-Lys) hydrochloride (HCl) can be obtained by crystallizing a solution of L-Lys HCl, separating crystals having a purity of not less than 99% and then drying them. However, it is not necessary to use L-Lys of such high purity in a feed additive.

Amino acid solids can also be formed by directly drying a solution of an amino acid with a purity of as low as from 30 to 60% based on dry solid. However, a feed additive containing such amino acid solids has extremely poor handleability due to its hygroscopicity and caking tendency. Therefore, feed additives have generally been formulated from purified amino acids to obtain a product having good handleability.

On the other hand, since it is economically more desirable to use less pure amino acids in feed additives, a method of forming the feed additive by directly drying a fermentation broth containing amino acids has been attempted (Soviet Patent No. 480,397, French Patent No. 2,217,347, etc). Unfortunately, powders formed using such methods retain many impurities contained in the broth, resulting in a product which is extremely hygroscopic and which cakes easily. Additionally, such powders often form large lumps, making the product hard to handle.

In order to avoid caking due to hygroscopicity and to form a feed additive with good handleability, a method has been disclosed in which an additive is mixed with a fermentation broth, and then the mixture is dried. In French Patent No. 2,217,347, a dehydrating agent such as powdery silica, expanded perlite, bone meal, rice bran, calcium carbonate or fluorine-free phosphate is mixed with a fermentation broth and dried. However, when these additives were mixed in amounts identical to or greater than that of the amino acids in the fermentation broth, no physically stable solid composition was formed.

U.S. Pat. No. 4,327,118 describes a method of forming a solid composition by drying a mixture of (1) an inorganic additive such as lime and carbon dioxide, or carbon dioxide combined with lime and precipitated magnesium carbonate or precipitated magnesium carbonate and (2) a condensed L-lysine fermentation broth. The content of L-lysine in the solid composition formed by the method, however, is from about 10 to 35%. This amount of L-lysine as an effective ingredient in a feed additive is not practically useful.

U.S. Pat. No. 5,431,933 discloses a method for obtaining granules with good handleability directly from a fermentation broths by first separating a part of the biomass from the fermentation broth and subsequently drying, for example by spray drying, the remaining fermentation broth.

Japanese Laid-Open Patent Publication No. 06-296460 (also EP 615693) discloses a method for preparing a granular product which is "only slightly" hygroscopic and sticky, by directly spray-drying a fermentation broth. Neither the caking property nor the agglomerability of the granular product after storage is disclosed.

U.S. Pat. No. 5,133,976 discloses a method for producing a stable dried product having reduced hygroscopicity by condensing and drying a fermentation broth of L-lysine which is obtained under special fermentation conditions. However, since it is necessary to ferment under specific conditions, the operation is complicated and not practical.

SUMMARY OF THE INVENTION

Accordingly, one object of the present invention is to provide a feed additive mainly comprising amino acids which has extremely reduced caking tendency.

A second object of the present invention is to provide a process for producing the above feed additive simply and economically without greatly affecting the composition of the feed additive.

The present inventors have now found that the caking tendency of a feed additive are improved by mixing a granular feed additive mainly comprising amino acids with a caking preventive agent.

DETAILED DESCRIPTION OF THE PREFERRED EMBODIMENTS

The present invention provides a feed additive obtained by mixing granules containing from 30 to 90% by weight, on the dry basis, of amino acid(s) with a caking preventive agent, wherein the mixing ratio of caking preventive agent to granules is from 0.1 to 5% by weight. Using this process, a feed additive with improved caking tendency can be formed without greatly affecting the overall content of the composition of feed additive.

Suitable granules mainly comprising amino acids are not particularly limited so long as they are formed using conventional methods. The content of amino acids is preferably from 30 to 90% by weight, in a free form on the dry basis, preferably, from 30 to 60%.

Suitable granules in accordance with the present invention preferably have a bulk density of from 400 to 800 kg/m$^3$, particularly preferably 500 to 800 kg/m$^3$.

Suitable granules in accordance with the present invention have a particle size of from 300 to 5,000 µm, preferably 400 to 1500 µm.

Suitable amino acids which are useful in terms of an animal physiology include glycine, L-alanine, L-valine, L-cysteine, L-phenylalanine, L-lysine, L-tryptophan or L-threonine or mixtures thereof.

Suitable materials for producing the granules include powders and/or solutions containing the amino acids mentioned above.

Suitable powders containing the amino acids are not particularly restricted with regard to the origin so long as they are an amino acid-containing powder usable as a starting material for granulation. For instance, various kinds of amino acid-containing liquids dried or solidified by spray drying can be used.

Similarly, suitable solutions containing the amino acids are not particularly restricted with regard to the origin so long as they are an amino acid-containing liquid usable as a starting material for granulation. It is possible to use a fermentation broth containing various amino acids or a liquid mixture thereof; a liquid from which the biomass has been removed (i.e., microorganism cells can be removed from a fermentation broth by centrifugation and membranefiltration); an amino acid-containing liquid formed by purifying a fermentation broth using various kinds of resins such as ion-exchange resins; a mother liquor obtained by separating amino acids through crystallization; or a condensed liquid of these amino acid-containing liquids.

Suitable caking preventive agents include silica gel, sucrose fatty acid ester, glycerine fatty acid ester, branched amino acid, calcium salt, magnesium salt, aluminum silicate, magnesium oxide, alumina, zeolite, talc, diatomaceous silica, perlite, disodium hydrogen phosphate and mixtures thereof.

The content of a trace amount of non-targeted amino acids, sucrose, inorganic materials and organic acids contained as impurities in the fermentation broth is different in every batch depending on the fermentation, and the compositions are also different depending on the kinds of amino acids targeted. Although the hygroscopicity of the formed granular products is different depending on the impurities content, since the flowability of the feed additive is maintained at a satisfactory level by adding and mixing a caking preventive agent into the granular products, a feed additive improved with caking tendency can be formed unaffected by the hygroscopicity and caking tendency of the granular amino acid product. Accordingly, an amino acid-containing liquid such as a fermentation broth containing a large amount of impurities other than amino acids can be used as a starting material for the granules used in the present invention with no strict control of the content of the ingredients.

Preferred caking preventive agents include sucrose fatty acid ester (a mixture of 1 mol of sucrose bonded with one mol of stearic acid or palmitic acid and 1 mol of sucrose bonded with 2 mols of stearic acid or palmitic acid), a glycerin fatty acid ester (having a monoester (monoglyceride) content of from 40 to 60% and containing a fatty acid alkali salt) and a branched amino acid such as L-leucine, L-isoleucine or L-valine. The branched amino acid does not have a hygroscopicity and caking tendency of its own and is particularly effective as a caking preventive agent for use in the present invention.

As the calcium salt, organic or inorganic calcium salts such as calcium monohydrogen phosphate, calcium dihydrogen phosphate, calcium carbonate, tricalcium phosphate, calcium silicate, calcium chloride anhydrous, calcium hydroxide, calcium gluconate or a mixture thereof are especially effective in the present invention.

As the magnesium salt, organic or inorganic magnesium salts such as dried magnesium sulfate, magnesium carbonate, magnesium hydroxide, magnesium silicate, magnesium chloride or magnesium sulfate anhydrous or a mixture thereof are especially effective in the present invention.

Further, the inventors of the present invention have found that the caking preventive effect can be improved by decreasing the particle size of the caking preventive agent. Accordingly, the caking preventive agent preferably has a 50% mean diameter of from 1 to 50 $\mu$m, more preferably from 1 to 15 $\mu$m.

For example, when a calcium carbonate is used as the caking preventive agent, both a sample having a 50% mean diameter of 13.32 $\mu$m (90% diameter of 21.9 $\mu$m, 10% diameter of 6.1 $\mu$m) as well as a sample having a 50% mean diameter of 6.8 $\mu$m (90% diameter of 22.7 $\mu$m, 10% diameter of 1.9 $\mu$m) have satisfactory caking preventive effect; but a more satisfactory caking preventive effect can be obtained in the latter. In addition, since fine particle silica gel having a 50% mean diameter of about 2 $\mu$m has excellent fluidity of its own, an excellent caking preventive effect can be realized when it is used.

The caking preventive agent can be formed into fine particles and, in terms of particle size, can be reduced into a predetermined level easily and economically using various kinds of pulverizers such as a hammer mill, Fitz mill or pin mill. The caking preventive effect is remarkably improved by forming the caking preventive agent into fine particles of a predetermined particle size.

The feed additive according to the present invention can be produced as explained below.

Since it is not necessary to control the hygroscopicity of the granular particles used in the present invention, the granulation method for obtaining the granules is not particularly limited. Granules obtained, for example, by directly drying or by granulating a fermentation broth of amino acids, can be used.

Conventional means can be used to granulate an amino acid-containing liquid. For example, an amino acid-containing solution can be dried and subsequently granulated. Alternatively, the solution can be crystallized and dried simultaneously using seed crystals. The amino acid-containing liquid can be dried by means of spray-dryer, drum-dryer or the like.

An amino acid-containing powder can be granulated by means of a granulator (such as a mixing granulator, a fluidized bed granulator, a compression granulator, etc.). An amino acid solution (i.e., the broth itself, a microorganism-removed-broth and the like) can also be added as a binder to the powder to facilitate granulation.

Preferably a fluidized bed granulator, such as a tumbling fluidized bed granulator, is used to produce granules having high bulk density.

If the solid dried from the amino acid-containing liquid is in the form of flakes, the granulation methods described above can be used after the flakes are pulverized by pin-mill or the like into a powder. Alternatively, a compression granulator can be used for granulating the flakes. Due to the composition of the amino acid-containing liquid, the dried flakes are sometimes tacky or sticky. These types of solids are preferably granulated in a compression granulator.

Alternatively, an amino acid-containing liquid can be simultaneously to dried and granulated using seed crystals and a fluidized bed granulator. A seed crystal of an amino acid-containing solid is initially fluidized in a granulator. Subsequently, an amino acid-containing liquid (i.e., the broth itself, a microorganisms-removed-broth, etc.) is sprayed into the fluidized bed and the solution is granulated and dried simultaneously.

Suitable seed crystals include the amino acid-containing solids mentioned above. For example, the powder which is pulverized from a part of the product of the fluidized bed granulator can be used.

The caking preventive agent used in the present invention and a method of mixing the same are explained next.

An amino acid feed additive which is free from the caking of the granular materials, has good flowability and does not greatly lower the content of amino acids as a main ingredient, can be obtained by mixing an extremely small amount of the fine particles of the caking preventive agent with the granules mainly comprising amino acids. Mixing ratio of the caking preventive agent is preferably from 0.1 to 5.0%, more preferably from 0.1 to 2.0%, to the weight of granular feed additive.

The required amount of caking preventive agent to be mixed varies by the diameter of granular feed additive. At a granule size distribution of the present invention, the mixing ratio of caking preventive agent from 0.1 to 5% is adequate. For example, the caking tendency of a granule of L-lysine and a powder comprising L-lysine, both made from same L-lysine fermentation broth, were compared. The granule showed lower caking tendency than the powder when the same mixing ratio of caking preventive agent was used.

The caking preventive agent can be easily mixed into the granular feed additive using a commonly used powder agitating mixer such as a ribbon blender, a sigma-type kneader, a paddle mixer and a rocking mixer. When fine particles of the caking preventive agent are mixed with the granules, the surface of the granules are coated, the coated granules are more effective.

EXAMPLES

Having generally described this invention, a further understanding can be obtained by reference to certain specific examples which are provided herein for purposes of illustration only and are not intended to be limiting unless otherwise specified.

Example 1

Strains of *Brevibacterium lactofermentum* AJ 12593 (FERM BP-3240) were inoculated in a culture medium comprising 80 g/L of waste molasses as a sucrose, 50 g/L of ammonium sulfate, 1 g/L of $KH_2PO_4$, 1 g/L of $MgSO_4 \cdot 7H_2O$, 10 mg/L of soybean protein hydrolyzate (as nitrogen), 0.1 mg/L of thiamine hydrochloride, 50 g/L of calcium carbonate and 0.3 mg/L of biotin. The mixture was cultured while agitating at 31.5° C. for 72 hours to form a L-lysine fermentation broth. Then, the resultant fermentation broth was dried using a drum dryer to form 5 kg of a dried flaky product having the composition below.

| | | |
|---|---|---|
| L-lysine | 50.9% | |
| Other amino acids | 3.7% | |
| Total nitrogen | 12.4% | |
| Ammonia-form nitrogen | 0.2% | |
| Bacterial bodies | 13.4% | |
| Water content | 8.0% | |

A part of the dried flaky product was pulverized using a pin mill to form 750 g of a powder having a mean diameter of 100 μm. It was then added as a seed crystal to a tumbling fluidized bed granulator (trade name: SFC-MINI, manufactured by Freund Industry Co.) and the remaining fermentation broth (the amount is 6 kg) was sprayed and granulated under the conditions below.

| | |
|---|---|
| Hot blow temperature | 100° C. |
| Temperature of fluidized bed | 45 to 50° C. |
| Exhaust valve graduation | 6 → 9 |
| Fluid valve graduation | 6 → 10 |
| Slit valve graduation | 10 |
| Broth feed amount | 20 cc/min |
| (in a temperature-controlled fluidized bed) | |
| Rotor r.p.m. | 400 RPM |
| Agitator r.p.m. | 1200 RPM |
| Lump breaker r.p.m. | 4000 RPM |

As a result, 1.47 kg of granules having a water content of 3.6% and 0.34 kg of a bag powder were obtained. The details are shown below.

| | | |
|---|---|---|
| Mean diameter | D50 | 724 μm |
| | D10 | 1064 μm |
| | D90 | 455 μm |
| Bulk density | | 610 kg/m³ |
| Water content | | 3.6% |
| L-lysine | | 53.5% |
| Other amino acids | | 4.0% |

1 kg of the resultant granules was dried for 60 minutes using a small-sized fluidizing dryer to reduce the water content to 2.3%. It was further sieved with a sieve to obtain granules having a particle size of from 500 μm to 1,000 μm.

Resultant sieved granules were divided into 30 g each in a vinylchloride bag, and 0.09 g of each additive (caking preventive agent) corresponding to 0.3% was added respectively. They were sufficiently mixed for 3 minutes after the addition. The caking preventive agents used are shown below.

Fine-particle silica gel
L-leucine
L-isoleucine
L-valine
Sucrose fatty acid ester
Glycerine fatty acid ester
Calcium carbonate
Calcium monohydrogen phosphate
Calcium dihydrogen phosphate
Tricalcium phosphate
Calcium silicate
Calcium chloride anhydrous
Calcium hydroxide
Calcium gluconate
Magnesium oxide
Magnesium carbonate
Magnesium hydroxide
Magnesium sulfate anhydrous
Magnesium silicate
Magnesium chloride
Natural aluminum silicate
Disodium hydrogen phosphate
Alumina
Zeolite
Talc
Diatomaceous silica
Perlite Flowability and caking tendency of the thus-obtained sieved granular samples were evaluated as follows. Namely, 5 g of the sample was placed in a transparent styrol sample container having an inner diameter of about 3 cm, a height of about 6 cm and a capacity of about 40 cc. This was stored with the lid opened for 168 hours in a thermostable and moisture-stable container in a saturated salt solution kept at 25° C. The caking tendency of the sample in the container were measured.

The degree of the caking was evaluated and given five grades as follows.

Extremely satisfactory (I): The sample is fluidized alone by inclining the container.
Satisfactory (II): Although most of the samples fluidized when the container is inclined, agglomerates are found in portions such as the surface. All of the sample granules are fluidized if it is shaken.

Partly caked (III): Partly caked. The sample does not move even if it is tapped softy.

Caked entirely (IV): Caking due to hygroscopicity of sample granules is recognized, and even if the container is inclined the sample is solidified like cakes. When intense shock is exerted, the sample is collapsed.

Strongly caked (V): caking of the sample granules due to hygroscopicity is vigorous, and granules are strongly joined and do not collapse.

The evaluation of the caking-prevention effect is shown in Table 1. A remarkable caking-preventive effect was recognized compared with the granular particles to which no caking preventive agent added.

TABLE 1

Result of evaluation of any caking-prevention effect

| caking preventive agent | Humidity (25° C.) | | | | |
|---|---|---|---|---|---|
| (0–3% added) | 33% | 43% | 58% | 65% | 76% |
| No addition | II | IV | V | V | V |
| Fine-particle silica gel | I | II | III | IV | IV |
| L-leucine | I | II | III | IV | IV |
| L-isoleucine | I | II | III | IV | IV |
| L-valine | I | II | III | IV | IV |
| Glycerine fatty acid ester | I | I | II | III | IV |
| Sucrose fatty acid ester | II | III | IV | V | V |
| Calcium carbonate | I | II | III | IV | V |
| Calcium monohydrogen phosphate | II | III | IV | V | V |
| Calcium dihydrogen phosphate | II | III | IV | V | V |
| Tricalcium phosphate | I | II | IV | IV | V |
| Calcium silicate | II | III | IV | V | V |
| Calcium chloride anhydrous | II | III | IV | V | V |
| Calcium hydroxide | II | III | IV | V | V |
| Calcium gluconate | II | III | IV | V | V |
| Magnesium oxide | I | III | IV | V | V |
| Magnesium carbonate | I | II | III | IV | V |
| Magnesium hydroxide | II | II | IV | IV | V |
| Magnesium sulfate anhydrous | II | II | IV | IV | V |
| Magnesium silicate | II | III | IV | V | V |
| Magnesium chloride | II | II | IV | V | V |
| Natural aluminum silicate | II | II | IV | V | V |
| Disodium hydrogen phosphate | II | III | IV | V | V |
| Alumina | II | III | IV | V | V |
| Talc | II | III | IV | V | V |
| Zeolite | II | III | IV | V | V |
| Diatomaceous silica | I | II | IV | V | V |
| Perlite | I | II | IV | V | V |

L-lysine granules formed in the same manner were sieved with a sieve to different granule sizes, and experiments were conducted for the caking-prevention effect of the same caking preventive agent depending on the difference of the particle size of the granules. The results are shown in Tables 2 and 3 below. Experiments were conducted using fine-particle silica gel as the caking preventive agent and the amount thereof to be mixed was 0.3% and 0.5%.

It was found that the caking-prevention effect was increased as the particle size of the granules was larger in the case where the same amount of the caking preventive agent was added.

TABLE 2

Result of evaluation of the caking-prevention effect for each particle size (in the case of adding 0.3% silica gel based on the granules)

| Particle size of | Humidity (25° C.) | | | | |
|---|---|---|---|---|---|
| granules | 33% | 43% | 58% | 65% | 76% |
| Spray dry (50 μm) | II | V | V | V | V |
| 125–425 μm | I | II | IV | V | V |
| 425–1,000 μm | I | II | III | IV | IV |
| 1,000–2,000 μm | I | I | II | II | V |

TABLE 3

Result of evaluation of the caking-prevention effect or each particle size (in the case of adding 0.5% silica gel based on the granules)

| Particle size of | Humidity (25° C.) | | | | |
|---|---|---|---|---|---|
| granules | 33% | 43% | 58% | 65% | 76% |
| Spray dry (50 μm) | II | III | V | V | V |
| 125–425 μm | I | II | III | V | V |
| 425–1,000 μm | I | II | III | III | IV |
| 1,000–2,000 μm | I | I | II | II | V |

Example 2

2.6 kg of dried flaky products (water content 8%) obtained in Example 1 was pulverized using pin-mill and the granulated using a mixing granulator (Rodige mixer) with water as binder under the conditions below.

| Type | M-20 (drum capacity 20 L) |
|---|---|
| Charged amount | 2.6 kg (6L) |
| Shovel r.p.m. | 230 r.p.m. |
| Chopper r.p.m. | 3,000 r.p.m. |
| Mixing granulating time | 4 min. |

The particle size distribution of the resultant 2.4 kg of granular sample (bulk density 550 kg/m$^3$) is shown below.

| 1 mm on | 12% |
|---|---|
| 0.5–1 mm | 43% |
| 0.25–0.5 mm | 21% |
| 0.1–0.25 mm | 17% |
| 0.1 mm pass | 7% |

The resultant product reduce the water content to not more than 3%. The sample was sieved with a sieve and 0.09 g of calcium carbonate corresponding to 0.3% was added and mixed to 30 g of the sample having a particle size of from 425 μm to 1000 μm, then it was evaluated for its caking-preventive effect according to the method of Example 1. Calcium carbonate used is in Reagent grade and Whiton F, and has an mean diameter as given below.

| Calcium carbonate | |
|---|---|
| Reagent grade | 50-% mean diameter 13.32 μm |
| Whiton F | 50-% mean diameter 6.8 μm |

The results of the evaluation are given in Table 4. The caking-preventive effect could be recognized also with respect to the granules formed by different production processes. In addition, the caking-prevention effect could also be enhanced by reducing the particle size of the caking preventive agent.

TABLE 4

Result of evaluation of caking-prevention effect

| Caking preventive agent | Humidity (25° C.) | | | | |
|---|---|---|---|---|---|
| (added 0.3%) | 33% | 43% | 58% | 65% | 76% |
| No addition | II | IV | V | V | V |
| Calcium carbonate reagent grade | I | II | III | V | V |
| Calcium carbonate whiton F | I | II | III | IV | V |

Comparative Example 1

2.6 kg of dried flaky products (water content 8%) obtained in Example 1 was pulverized using pin-mill. 7.2 g of calcium carbonate (Whiton F) corresponding to about 0.3% was added and mixed to the resultant powdery product. The mixture was granulated using an mixing granulator (Rodige mixer) with water as binder under the conditions below.

| Type | M-20 (drum capacity 20 L) |
|---|---|
| Charged amount | 2.6 kg (6L) |
| Shovel r.p.m. | 230 r.p.m. |
| Chopper r.p.m. | 3,000 r.p.m. |
| Mixing granulating time | 4 min. |

The resultant product reduce the water content to not more than 3%. The sample was sieved with a sieve from 425 μm to 1000 μm, then it was evaluated for its caking-prevention effect according to the method of Example 1.

The results of the evaluation are given in Table 5. The caking degree of this sample is as same as the sample which is not added caking preventive agent in Example 2. It is found that the caking-preventive effect can not be obtained if the caking preventive agent added before granulating but can be obtained satisfactorily if the caking preventive agent added after granulating.

TABLE 5

Result of evaluation of caking-preventive effect

| Caking preventive agent | Humidity (25° C.) | | | | |
|---|---|---|---|---|---|
| (0.3% added) | 33% | 43% | 58% | 65% | 76% |
| Calcium carbonate Whiton F (added before granulating) | II | IV | V | V | V |

Example 3

A part of content such as microorganism cells was separated from the fermentation broth obtained in Example 1 using DeLaval-type centrifuge. A broth separated a part of microorganism cells was formed by mixing a resultant broth separated microorganism cells and a fermentation broth obtained in Example 1 (mixing rate is 1 by 1). Then, the resultant broth separated a part of microorganism cells was dried using a drum dryer to form 4.5 kg of a dried flaky product having the composition below.

| L-lysine | 55.3% |
|---|---|
| Other amino acids | 4.1% |
| Total nitrogen | 12.7% |
| Ammonia-form nitrogen | 0.2% |
| Microorganism cells | 6.8% |
| Water content | 7.0% |

A part of the dried flaky product was pulverized using a pin mill to form 750 g of a powder having a mean diameter of 120 μm. It was charged, for the seed crystal, into an tumbling fluidized bed granulator(trade name: SFC-MINI, manufactured by Freund Industry Co.) and the resultant broth separated a part of microorganism cells (the amount is 6 kg) was sprayed and granulated under the conditions below.

| Hot blow temperature | 100° C. |
|---|---|
| Temperature of fluidized bed | 45 to 50° C. |
| Exhaust valve graduation | 6 → 9 |
| Fluid valve graduation | 6 → 10 |
| Slit valve graduation | 10 |
| Broth feed amount | 20 cc/min |
| Rotor r.p.m. | 400 RPM |
| Agitator r.p.m. | 1200 RPM |
| Lump breaker r.p.m. | 4000 RPM |

As a result, 1.62 kg of granules having a water content of 3.2% and 0.23 kg of a bag powder were obtained. The details are shown below.

| Mean diameter | D50 | 705 μm |
|---|---|---|
| | D10 | 1045 μm |
| | D90 | 415 μm |
| Bulk density | | 600 kg/m³ |
| Water content | | 3.2% |
| L-lysine | | 58.2% |
| Other amino acids | | 4.3% |

1 kg of the resultant granules was dried for 60 minutes using a small-sized fluidized bed dryer to reduce the water content to 2.1%. It was further sieved with a sieve to obtain granules having a particle size of from 500 μm to 1,000 μm.

Resultant sieved granules were divided into 30 g each in a vinylchloride bag, and 0.09 g of each additive (caking preventive agent) corresponding to 0.3% was added respectively. They were sufficiently mixed for 3 minutes after the addition. The caking preventive agents used are shown below.

Fine-particle silica gel

Calcium carbonate

Magnesium carbonate

The evaluation of the caking-preventive effect is shown in Table 6. A remarkable caking-preventive effect was also recognized to the granule using the broth separated a part of microorganism cells.

TABLE 6

Result of evaluation of caking-prevention effect

| Caking preventive agent | Humidity (25° C.) | | | | |
|---|---|---|---|---|---|
| (added 0.3%) | 33% | 43% | 58% | 65% | 76% |
| No addition | II | IV | V | V | V |
| Fine-particle silica gel | I | II | III | IV | IV |
| Calcium carbonate | I | II | III | IV | V |
| Magnesium carbonate | I | II | III | IV | V |

Example 4

Strains of bacteria of *Escherichia coli* KB 862-pGH5 disclosed in PCT Application No. (WO 94-08031) were inoculated in a culture medium (pH 6.5) comprising 130 g/L of glucose, 25 g/L of ammonium sulfate, 12 g/L of fumaric acid, 3 ml/L of acetic acid, 1 g/L of $KH_2PO_4$, 10 mg/L of $MnSO_4.7H_2O$, 1 g/L of $MgSO_4.7H_2O$, 10 mg/L of a soybean protein hydrolyzate (as nitrogen), 2 mg/L of thiamine hydrochloride, 50 g/L of calcium carbonate and 0.05 mg/L of biotin, and cultured while agitating at 30° C. for 72 hours to form an L-tryptophan ferment broth. Next, resultant fermentation broth was dried using a laboratory mini-spray dryer to obtain 400 g of a powder having the composition below.

| L-tryptophan | 34.7% |
|---|---|
| Other amino acid(s) | 5.4% |
| Total nitrogen | 9.6% |
| Ammonia form nitrogen | 2.8% |
| Bacterial bodies | 18.3% |
| Water content | 5.0% |

The powder charged, for the seed crystal, into an tumbling fluidized bed granulator (trade name: SFC-MINI, manufactured by Freund Industry Co.), and 8 kg of the resultant L-tryptophan was sprayed and granulated under the conditions mentioned below.

| Hot blow temperature | 100° C. |
|---|---|
| Temperature of fluidized bed | 45–50° C. |
| Exhaust valve graduation | 6 → 9 |
| Fluid valve graduation | 6 → 10 |
| Slit valve graduation | 10 |
| Broth feed amount | 10 cc/min |
| (in a temperature-controlled fluidized bed) | |
| Rotor r.p.m. | 400 RPM |
| Agitator r.p.m. | 1200 RPM |
| Lump breaker r.p.m. | 4000 RPM |

As a result, 900 g of granules having a water content of 5.1% and 210 g of a bag powder were obtained. Details are shown below.

| Mean diameter | D50 | 634 μm |
|---|---|---|
| | D10 | 985 m |
| | D90 | 385 μm |
| Bulk density | | 620 kg/m³ |
| Water content | | 5.1% |
| L-tryptophan | | 37.3% |
| Other amino acids | | 5.6% |

0.8 kg of the resultant granules were dried for 60 min. using a small-sized fluidized bed dryer to reduce the water content to 2.8%. They were sieved with a sieve from 425 μm–1000 μm.

The resultant sieved granules were divided into 30 g each in a vinylchloride bag, and 0.09 g of an additive (agglomeration inhibitor) corresponding to 0.3% was added respectively. After the addition, each of them was mixed satisfactorily for 3 min. to smear with. The caking preventive agents used are shown below.

Fine particle silica gel
L-leucine
L-isoleucine
L-valine
Calcium carbonate
Tricalcium phosphate
Calcium chloride anhydrous
Magnesium carbonate
Magnesium hydroxide
Anhydrous magnesium sulfate
Natural aluminum silicate
Disodium hydrogen phosphate The flowability and caking tendency of the sieved granular samples were evaluated after being stored for 168 hours under the same conditions of humidity as those in Example 1. The results of the evaluation of any caking-preventive effect are shown in Table 7.

A caking-preventive effect was apparent compared with that of the sample granules to which no caking preventive agent was added.

TABLE 7

Result of evaluation of caking-preventive effect

| caking preventive agent | Humidity (25° C.) | | | | |
|---|---|---|---|---|---|
| (0.3% added) | 33% | 43% | 58% | 65% | 76% |
| No addition | II | IV | V | V | V |
| Fine-particle silica gel | I | II | III | IV | IV |
| L-leucine | I | II | III | IV | V |
| L-isoleucine | I | II | III | IV | IV |
| L-valine | I | II | III | V | V |
| Calcium carbonate | I | II | III | IV | V |
| Tricalcium phosphate | I | II | IV | IV | V |
| Calcium chloride anhydrous | III | III | IV | V | V |
| Magnesium carbonate | I | II | III | IV | V |
| Magnesium hydroxide | II | II | IV | IV | V |
| Anhydrous magnesium sulfate | II | II | IV | IV | V |
| Natural aluminum silicate | II | II | IV | V | V |
| Disodium hydrogen phosphate | II | III | IV | V | V |

Example 5

Strains of *Escherichia coli* BKIIM B-3996 as disclosed in U.S. Pat. No. 5,175,107 were inoculated in a culture medium (pH 7.0) comprising 40 g/L of sucrose, 5 g/L of ammonium sulfate, 2 g/L of $KH_2PO_4$, 20 mg/L of $MnSO_4.7H_2O$, 20 mg/L of $FeSO_4.7H_2O$, 0.4 g/L of $MgSO_4.7H_2O$, 2 g/L of yeast extract and 0.6 g/L of NaCl, and cultured while agitating at 37° C. for 36 hours to form an L-threonine ferment broth. The resultant fermentation broth was dried using a laboratory mini spray dryer to form 500 g of a powder having compositions given below.

| L-threonine | 47.5% |
|---|---|
| Other acids | 7.9% |
| Total nitrogen | 10.1% |
| Ammonium form nitrogen | 1.0% |

-continued

|  |  |
|---|---|
| Microorganism cells | 17.3% |
| Water content | 7.0% |

The resultant powder was charged, for a seed crystal, into an tumbling fluidized bed granulator (trade name: SFC-MINI, manufactured by Freund Industry Co.), and 6 kg of the resultant threonine broth was sprayed and granulated under the conditions mentioned below.

|  |  |
|---|---|
| Hot blow temperature | 100° C. |
| Temperature of fluidized bed | 40–45° C. |
| Exhaust valve graduation | 6 → 9 |
| Fluid valve graduation | 6 → 10 |
| Slit valve graduation | 10 |
| Broth feed amount | 10 cc/min |
| (in a temperature-controlled fluidized bed) |  |
| Rotor r.p.m. | 400 RPM |
| Agitator r.p.m. | 1200 RPM |
| Lump breaker r.p.m. | 4000 RPM |

As a result, 930 g of granules having a water content of 4.5% and 180 g of a bag powder were obtained. Details are shown below.

|  |  |  |
|---|---|---|
| Mean diameter | D50 | 800 μm |
|  | D10 | 1120 μm |
|  | D90 | 530 μm |
| Bulk density |  | 540 kg/m³ |
| Moisture content |  | 5.9% |
| L-threonine |  | 50.3% |
| Other amino acids |  | 8.3% |

0.8 kg of the sample was dried for 60 min. in a small-sized fluidized bed dryer to reduce the water content to 3.8%. It was sieved with a sieve from 425 μm to 1000 μm.

The resultant sieved granules (sieved granulated product) were divided into 30 g each in a vinylchloride bag, and 0.09 g of an additive (caking preventive agent) corresponding to 0.3% was added respectively. After the addition, each of them was mixed satisfactorily for 3 min.

The caking preventive agents used are given below.

Fine particle silica gel

L-leucine

L-isoleucine

L-valine

Calcium carbonate

Tricalcium phosphate

Calcium chloride anhydrous

Magnesium carbonate

Magnesium hydroxide

Anhydrous magnesium sulfate

Natural aluminum silicate

Disodium hydrogen phosphate

TABLE 8

Result of evaluation for caking-preventive effect

| caking preventive agent | Humidity (25° C.) | | | | |
|---|---|---|---|---|---|
| (0.3% added) | 33% | 43% | 58% | 65% | 76% |
| No addition | II | IV | V | V | V |
| Fine-particle silica gel | I | II | IV | IV | IV |
| L-leucine | I | II | III | IV | V |
| L-isoleucine | I | II | III | IV | IV |
| L-valine | I | II | IV | V | V |
| Calcium carbonate | I | II | IV | V | V |
| Tricalcium phosphate | I | II | IV | V | V |
| Calcium chloride anhydrous | III | III | IV | V | V |
| Magnesium carbonate | I | II | III | IV | V |
| Magnesium hydroxide | II | II | IV | IV | V |
| Anhydrous magnesium sulfate | II | II | IV | V | V |
| Natural aluminum silicate | II | II | IV | V | V |
| Disodium hydrogen phosphate | II | III | IV | V | V |

Having now fully described the invention, it will be apparent to one of ordinary skill in the art that many changes and modifications can be made thereto without departing from the spirit or scope of the invention as set forth herein.

This application is based on application No. 116227/1995 filed in Japan on May 16, 1995. The full text of this foreign application is incorporated herein by reference.

What is claimed as new and is desired to be secured by Letters Patent of the United States is:

1. A feed additive comprising granules obtained by drying or solidifying an amino acid-containing fermentation broth, said granules containing from 30 to 90% by weight, based on dry weight, or one or more amino acids, wherein said granules are mixed with a caking preventive agent selected from the group consisting of silica gel, sucrose fatty acid ester, glycerin fatty acid ester, branched amino acid, calcium salt, magnesium salt, aluminum silicate, magnesium oxide, alumina, zeolite, talc, diatomaceous silica, perlite, disodium hydrogen phosphate and mixtures thereof, and wherein the weight ratio of caking preventive agent to granules is from 0.001 to 0.05, the bulk density of the granules is from 400 to 800 kg/m³, 80 to 95% by weight of the total weight of the granules have a particle size of from 300 to 5000 μm, and the caking preventive agent comprises particles having a 50% mean diameter of from 1 μm to 50 μm.

2. The feed additive of claim 1, wherein the granules comprise L-lysine, L-tryptophan, L-threonine or a mixture thereof.

3. The feed additive of claim 1, wherein the calcium salt is selected from the group consisting of calcium monohydrogen phosphate, calcium dihydrogen phosphate, calcium carbonate, tricalcium phosphate, calcium silicate, calcium chloride anhydrous, calcium hydroxide, calcium gluconate and mixtures thereof.

4. The feed additive of claim 1, wherein the magnesium salt is selected from the group consisting of dried magnesium sulfate, magnesium carbonate, magnesium hydroxide, magnesium silicate, magnesium chloride, magnesium sulfate anhydrous and mixtures thereof.

5. A process for producing a feed additive, comprising the steps of:

granulating an amino acid-containing powder or solution obtained by drying or solidifying an amino acid-containing fermentation broth to form amino acid-containing granules, and mixing the amino acid-containing granules with a caking preventive agent selected from the group consisting of silica gel, sucrose fatty acid ester, glycerine fatty acid ester, branched amino acid, calcium salt, magnesium salt, aluminum silicate, magnesium oxide, alumina, zeolite, talc, diatomaceous silica, perlite, disodium hydrogen phosphate and mixtures thereof, wherein the weight ratio of caking preventive agent to granules is from 0.001 to 0.05, the bulk density of the granules is from 400 to 800 kg/m$^3$, 80 to 95% by weight of the total weight of the granules have a particle size from 300 to 5000 μm, and the caking preventive agent comprises particles having a 50% mean diameter of from 1 μm to 50 μm.

6. The process of claim 5, wherein the granules comprise L-lysine, L-tryptophan, L-threonine or a mixture thereof.

7. The process of claim 5, wherein the calcium salt is selected from the group consisting of calcium monohydrogen phosphate, calcium dihydrogen phosphate, calcium carbonate, tricalcium phosphate, calcium silicate, calcium chloride anhydrous, calcium hydroxide, calcium gluconate and mixtures thereof.

8. The feed additive of claim 1, consisting of said granules mixed on the surface thereof with said caking preventive agent.

9. The method of claim 5, consisting of said steps of granulating and mixing such that said granules are mixed on the surface thereof with said caking preventive agent.

10. A feed additive produced by the process of claim 5.

11. A feed additive produced by the process of claim 9.

* * * * *